United States Patent [19]
Nakajima et al.

[11] Patent Number: 5,511,217
[45] Date of Patent: Apr. 23, 1996

[54] COMPUTER SYSTEM OF VIRTUAL MACHINES SHARING A VECTOR PROCESSOR

[75] Inventors: Atsushi Nakajima, Fujisawa; Yaoko Nakagawa, Hadano, both of Japan

[73] Assignee: Hitachi, Ltd., Tokyo, Japan

[21] Appl. No.: 159,237

[22] Filed: Nov. 30, 1993

[30] Foreign Application Priority Data

Nov. 30, 1992 [JP] Japan .................................. 4-319755

[51] Int. Cl.$^6$ ............................... G06F 9/38; G06F 9/40; G06F 15/16
[52] U.S. Cl. ..................... 395/800; 364/228; 364/228.2; 364/229.5; 364/230.5; 364/232.21; 364/239.4; 364/242.9; 364/256.3; 364/256.6; 364/280; 364/DIG. 1; 364/DIG. 2
[58] Field of Search .................................... 395/800, 650, 395/600, 200, 325, 500, 775, 725, 700, 375, 575, 425, 200.01, 200.18, 182.15, 182.19; 364/DIG. 1, DIG. 2, 131, 132

[56] References Cited

U.S. PATENT DOCUMENTS

| | | | |
|---|---|---|---|
| 4,722,049 | 1/1988 | Lahti | 395/375 |
| 4,780,811 | 10/1988 | Aoyama et al. | 395/375 |
| 5,123,095 | 6/1992 | Papadopoulos et al. | 395/375 |
| 5,249,293 | 9/1993 | Schreiber et al. | 395/650 |
| 5,276,881 | 1/1994 | Chan et al. | 395/700 |
| 5,285,528 | 2/1994 | Hare | 395/725 |
| 5,291,581 | 3/1994 | Cutler et al. | 395/425 |

FOREIGN PATENT DOCUMENTS

| | | |
|---|---|---|
| 61-22825 | 6/1984 | Japan . |
| 64-54542 | 3/1989 | Japan . |

Primary Examiner—Daniel J. Pan
Attorney, Agent, or Firm—Fay, Sharpe, Beall, Fagan, Minnich & McKee

[57] ABSTRACT

In a virtual-machine system running on a supercomputer wherein a vector processor is shared among a plurality of operating systems/virtual machines enhancing of the efficiency of a system as a whole is provided. When an activation, status-test or set-up instruction of a vector processor 2 is executed while an OS is running on a scalar processor 1 with an interception flag 7 set to the logic value 1, an exception is generated, canceling the execution of the instruction. In the processing of the interception, whether the logic value of the interception flag is 1 and whether the instruction giving rise to the exception is an activation, status-test or set-up instruction of the vector processor 2 are examined. If the logic value is 1 and the activation, status-test or set-up instruction is verified, an interception is carried out. The virtual-machine monitor emulates the end-interrupt processing of the vector processor, allowing the utilization efficiency of the vector processor to be increased. In addition, the virtual-machine monitor saves and restores control information of the vector processor 2 and initial values of vector processing from and into registers, allowing the efficiency of the system as a whole to be enhanced.

25 Claims, 6 Drawing Sheets

COMPUTER SYSTEM OF VIRTUAL MACHINES SHARING A VECTOR PROCESSOR

BACKGROUND OF THE INVENTION

The present invention relates to virtual-computation in general and, in particular, to a virtual-machine system implemented by a supercomputer on which a plurality of operating systems run.

A virtual-machine system is here a multiprocessor computer system that runs multiple operating systems with each operating system running its own programs running within a virtual environment. In general, a virtual environment is simulated or conceptual, with a computer system doing the translation between the virtual environment and the actual or physical environment. Herein, terms such as real, actual and physical will refer to the existing hardware and software, in contrast to virtual components. A scalar processor is a computer that performs arithmetic computations on one number at a time, such numbers being bit representations of quantity without direction. In contrast, a vector processor is a computer which performs several calculations simultaneously. For example, in object-oriented computer graphics (vector graphics), a line is represented by its end points (coordinates) so that it has both quantity and direction as well as location. To move that line to a different place on the screen requires adding or subtracting the same number to both end points, with such calculations being conducted simultaneously to increase speed.

A system program used in the virtual-machine system for controlling the virtual machines is called a virtual-machine monitor. The functions of the virtual-machine monitor include the scheduling of the virtual machines and emulation of instructions which are issued by operating systems running on the virtual machines but which cannot be executed directly.

A multiprocessor configuration is a system that can run or more than one program or more than one arithmetic operation, or a combination of an arithmetic operation and a program, at the same time or simultaneously. When two or more computers are used, they are tied together with a high speed channel and share the general workload between them, e.g. they are closely coupled. In general, multiprocessing involves concurrent instruction executions.

A supercomputer as the term is used herein comprises a scalar processor for executing scalar as well as general processings at a high speed and a vector processor for executing vector processings also at a high speed. Such a supercomputer is characterized in that the scalar and vector processors can operate concurrently. The scalar processor executes a specific instruction to specify the beginning of a vector processing to be carried out by the vector processor, i.e. the scalar processor executes the specific instruction to activate the vector processor. When the vector processor completes the vector processing, it enters an end-interrupt hold state, notifying the scalar processor of the completion of the vector processing.

The supercomputer is mainly used as a computer for processing scientific and engineering calculations at a high speed. In addition, the supercomputer is provided with functions suitable for applications in the domain of a general-purpose computer. Moreover, the trend shows that a multiprocessor configuration is becoming the mainstream. A multiprocessor configuration comprises a plurality of units interconnected one to another, with each unit further comprising a pair of scalar and vector processors. At the same time, there is a strong demand for effective utilization of computer resources. In order to meet the demand, such a multiprocessor configuration is used as a supercomputer on which a plurality of operating systems are run concurrently so as to implement the functions of a virtual-machine system.

Implementation of a virtual-machine system on supercomputer hardware is disclosed in Japanese Patent Laid-open No. Showa 64-54542 entitled "Virtual-Machine System". A virtual-machine system comprises vector and scalar processors (called vector and scalar units respectively in the publication). The vector processor is exclusively used as dedicated hardware in conjunction with a single operating system OS by a virtual-machine whereas the scalar processor is shared by a plurality of virtual machines each running an OS.

SUMMARY

It is part of the present invention to analyze the prior art, identify problems, analyze the problems and their causes, and provide solutions to such problems. A virtual-machine system that allows a vector processor to be shared among a plurality of virtual machines and the operating systems thereof is not disclosed in the prior art.

The inventors anticipate some problems that are raised when sharing a vector processor among a plurality of virtual machines and the operating systems thereof. These problems are:

(1) When the end-interrupt processing of the vector processor is emulated by the virtual-machine monitor, there is a possibility that the virtual machine invoking the vector processor incorrectly judges the status of the vector processor. This problem needs to be solved because the function to emulate the end-interrupt processing of the vector processor by the virtual-machine monitor is provided for enhancing the utilization efficiency of the vector processor. This is because, once the vector processor enters an end-interrupt hold state, the vector processor would remain in this state, not able to execute a next vector processing until the scalar processor later on detects the hold state when running the OS that instructed the vector processing, executes an end-interrupt processing and releases the vector processor from the end interrupt hold state to the idle state.

In general, an OS is intended for enhancing the concurrent operability of the vector processor and the scalar processor in an environment with the scalar processor exclusively occupying the vector processor, that is without sharing the vector processor among different OS's. Therefore, an OS is not keeping track of the vector processing carried out by the vector processor all the time until the vector processing is completed. When the OS activating the vector processor does not perform the end-interrupt processing for a long time elapsing since the end of a vector processing carried out by the vector processor, other operating systems cannot activate the vector processor. As a result, the utilization efficiency of the vector processor is inevitably decreased. In order to solve this problem, the end-interrupt processing of the vector processor is emulated by the virtual-machine monitor. In this way, the length of the end-interrupt hold state of the vector processor can be shortened significantly, putting the vector processor in an idle state ready for the next vector processing execution by any operating system.

However, the contemporary scalar processor would not notify the OS that activated the vector processor of the releasing of the vector processor from the end-interrupt hold state at the end of the emulation of the end-interrupt processing by the virtual-machine monitor. That is why the OS must interrogate the status of the vector processor. In the interrogating operation, an end-interrupt hold state may be inevitably misinterpreted as a released end-interrupt hold state or idle state.

(2) A second problem is related to the saving and restoration of control information and initial values of a vector processor stored in registers of the vector processor.

As described above, in the conventional virtual-machine system, the vector processor is exclusively occupied by the OS of a single virtual machine. In this case, it is not necessary to save and restore the control information and the initial values of processings from and into the registers of the vector processor. In the case of a virtual-machine system in which the vector processor thereof is shared among operating systems running on a plurality of virtual machines, on the other hand, it becomes necessary to save and restore the control information and the initial values of processings from and to the registers of the vector processor. The problem is at what point of time the saving and restoration should be accomplished.

In general, resources of the scalar processor shared among a plurality of operating systems are saved and restored when the scalar processor is switched from one OS to another. If the saving and restoration of the control information and initial values of the registers of the vector processor are also carried out when the vector processor is switched from one OS to another much like the scalar processor, there is a certain danger of the efficiency of the system as a whole decreasing. This is because, while the vector processor is carrying out vector processing, operating systems other than the OS activating the vector processor cannot run on the vector processor. In addition, the amount of control information and the number of initial values for processings stored in the registers of the vector processor increase considerably in the case of a supercomputer, lengthening the time required for saving and restoring them. Accordingly, it is desirable to reduce the number of times the control information and the initial values of processings are saved and restored for the vector processor.

It is an object of the present invention to share a vector processor among virtual machines having operating OS's on one or more scalar processors, and more specifically in such an environment to solve the first and second problems of the virtual-machine system to enhance the efficiency of the system as a whole.

(1) In the virtual-machine system provided by the present invention wherein multiple operation systems run on a supercomputer, when the virtual-machine monitor starts execution with an OS that will most likely use the vector processor, the virtual-machine monitor sets a logic value 1 to an interception flag to indicate that the vector processor will be used. Later, when the scalar processor makes an attempt to use the vector processor, e.g. to execute an instruction to interrogate the status of the vector processor, the interception flag is examined. If the result of the examination indicates that the logic value of the interception flag is 1, the scalar processor generates an interrupt prior to the execution of the instruction for interrogating the status of the vector processor, canceling the execution of the instruction. At the same time, the operation of the currently running OS is suspended and the virtual-machine monitor is requested to emulate the execution of the instruction. If the result of the examination indicates that the logic value of the interception flag is 0, on the other hand, the scalar processor executes the instruction normally, allowing the currently running OS to continue its operation.

In this way, the problem of incorrectly judging the status of the vector processor by the OS activating the vector processor, a problem which usually occurs after the emulation of the end-interrupt processing of the vector processor has been done by the virtual-machine monitor, can be solved. In other words, the first problem described above is thereby resolved.

(2) In the virtual-machine system provided by the present invention wherein the multiple operating systems run on a supercomputer, when the virtual-machine monitor starts an OS that will most likely use the vector processor, the virtual-machine monitor sets a logic value 1 to the interception flag to indicate that the vector processor will be used. Later, when the scalar processor makes an attempt to execute either an instruction to reference or update a register for holding control information or processing initial values of the vector processor or an instruction to request the vector processor to start a vector processing (an instruction to activate the vector processor), the interception flag is examined. If the result of the examination indicates that the logic value of the interception flag is 1, the scalar processor generates an interrupt prior to the execution of the instruction and cancels the execution of the instruction. At the same time, the operation of the currently running OS is suspended and the virtual-machine monitor emulates the execution of the instruction. If the result of the examination indicates that the logic value of the interception flag is 0, on the other hand, the scalar processor executes the instruction normally, allowing the currently running OS to continue its operation.

In this way, a chance to save and restore the control information and the processing initial values of the vector processor from and to the registers can be given to the virtual-machine monitor. In other words, the second problem described above is thereby solved.

BRIEF DESCRIPTION OF THE DRAWINGS

Further objects, features and advantages of the present invention will become more clear from the following detailed description of a preferred embodiment, shown in the accompanying drawings, wherein.

DETAILED DESCRIPTION OF A PREFERRED EMBODIMENT

Figure 1:
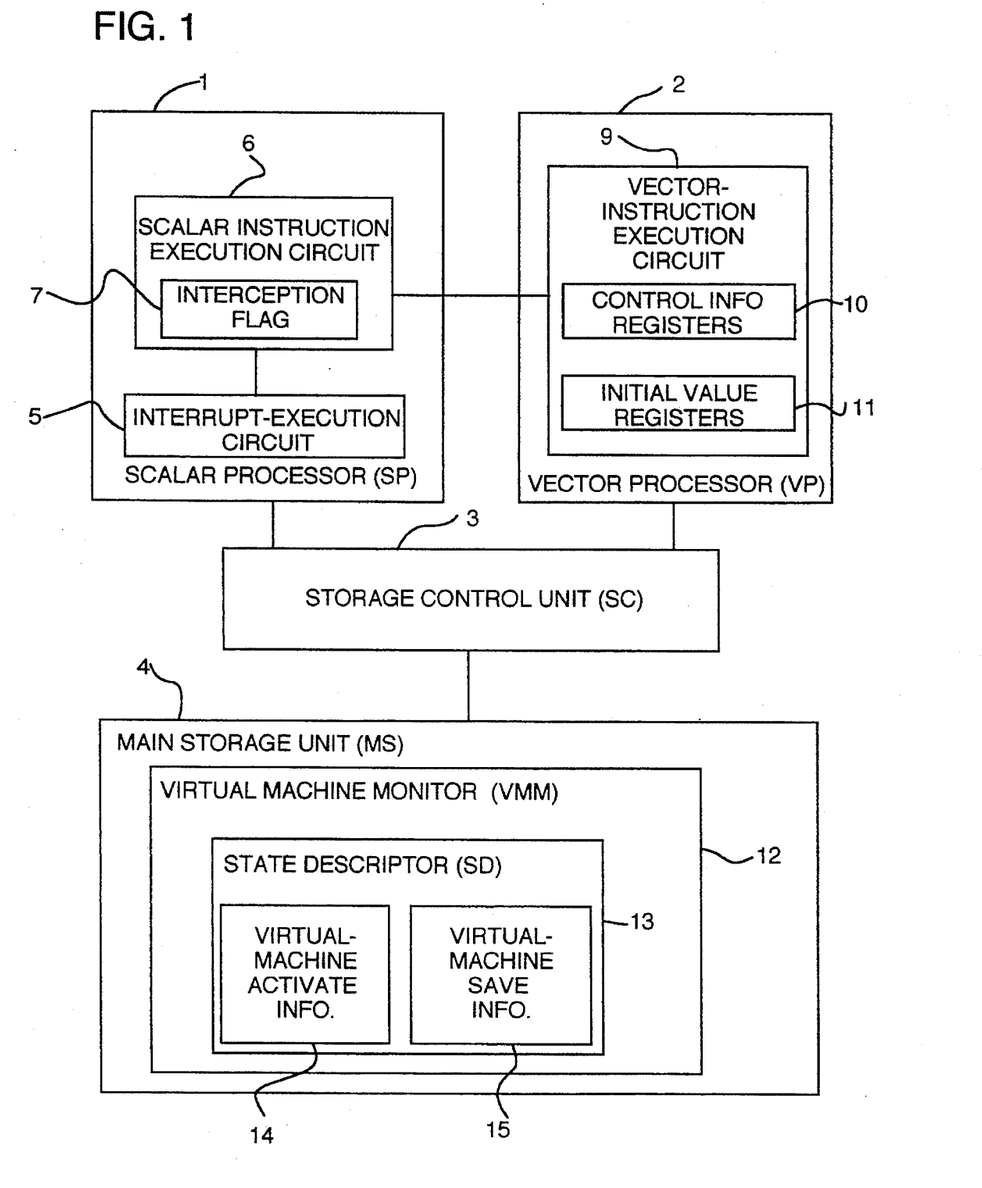
FIG. 1 shows a diagram of a supercomputer to which the present invention is applied.

FIG. 1 is a diagram of a supercomputer to which the present invention is applied. A scalar processor (SP) 1 handles scalar processing whereas a vector processor (VP) 2 handles vector processing. A storage control unit (SC) 3 controls operations to reference and update the contents of a main storage unit (MS) 4 in accordance with instructions issued by the scalar processor 1 and vector processor 2.

The scalar processor 1 has an extended scalar instruction execution circuit 6 and an interrupt-execution circuit 5. The scalar instruction execution circuit 6 has an interception flag 7 (not found in the prior art). The interrupt-execution circuit 5 performs the end-interrupt processing of the vector processor 2 and a program-interrupt processing in the event of an exception occurring in the execution of a scalar instruction. In a program-interrupt processing, a current PSW (Program Status Word) and information on the cause of the interrupt are stored in an area allocated specially for the cause of the interrupt in the main storage unit 4, and the data thus stored in the area allocated specially for the cause of the interrupt in the main storage unit 4 is then set as a new PSW. The areas serve as a facility to be used by the interrupt-execution circuit 5 for carrying out a processing step for each interrupt cause. That is to say, in the event of an interrupt, a processing step associated with the cause of the interrupt is executed by accessing the areas.

The vector processor 2 has a vector-instruction execution circuit 9 for executing vector instructions, registers 10 for holding control information of the vector processor 2 and registers 11 for holding initial values of vector processing. A scalar instruction for transferring data stored in a register of the scalar-instruction execution circuit 6 or stored in the main storage unit 4 is called a set-up instruction. A scalar instruction for requesting the execution of a vector processing instruction stored in the main storage unit 4, that is, a scalar instruction for activating the vector processor 2, is called an EXVP (Execute Vector Processing) instruction.

Figure 2:
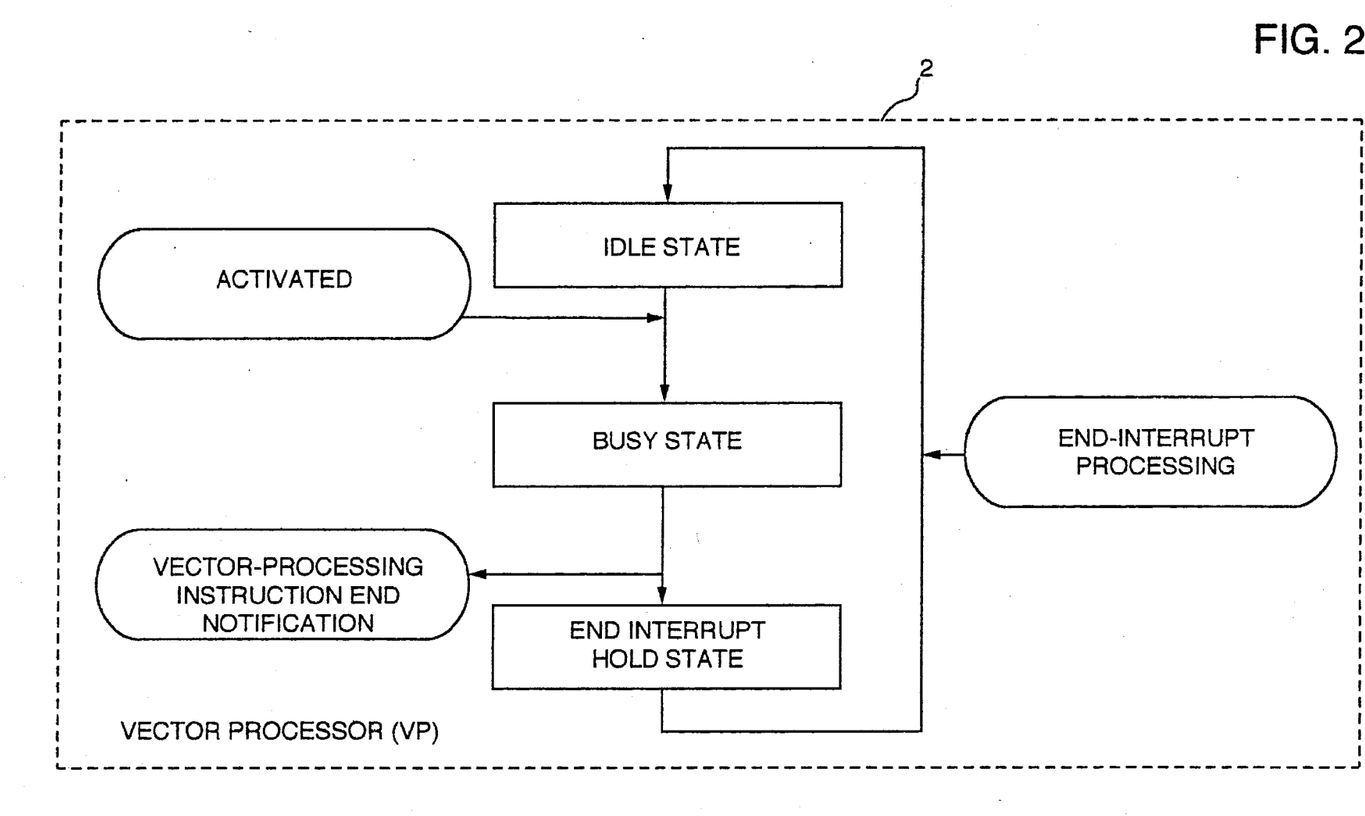
FIG. 2 shows a state-transition diagram of the vector processor of FIG. 1.

As shown in FIG. 2, the vector processor 2 can be in one of three states: idle, busy and end-interrupt hold states. The scalar instruction execution circuit 6 is notified by the vector-instruction execution circuit 9 of the status of the vector processor 2, that is, whether the vector processor 2 is in an idle, busy or end-interrupt hold state. In an idle state, the vector processor 2 can be activated by the scalar processor 1 running any one of the OS's, i.e. can be activated by any of the virtual machines or at least a plurality of them. When activated, the vector processor 2 enters a busy state. At the end of the processing of a vector-processing instruction, the vector processor 2 undergoes a transition from the busy state to an end-interrupt hold state. As described above, the scalar processor 1 is notified by the vector processor of the fact that the vector processor 2 is in the end-interrupt hold state. Depending upon the value of an end-interrupt masking with respect to a special bit in a PSW register, the scalar processor 1 may acknowledge the notification transmitted by the vector-instruction execution circuit 9 and forward it to the interrupt-execution circuit 5. In this way, the interrupt-execution circuit 5 is informed of the occurrence of an end interrupt. Notified of the occurrence of the end interrupt, the interrupt-execution unit 5 executes an end-interrupt processing step. In the course of the end-interrupt processing step, the vector processor 2 is released from the end-interrupt hold state, undergoing a transition to the idle state. A scalar instruction for identifying the state of the vector processor 2 is called a TVP (Test Vector Processing) instruction.

A system program for controlling virtual machines (VMs), called a virtual-machine monitor 12, is stored in the main storage unit 4. When the scalar processor 1 encounters an SIE (Start Interpretive Execution) instruction during the execution of the virtual-machine monitor 12, the scalar processor 1 enters an IE (Interpretive Execution) mode, allowing a virtual machine (VM) (corresponding to an OS) to start running on the scalar processor 1. The SIE instruction has a state descriptor (SD) 13 as an operand. The state descriptor 13 comprises virtual-machine activate information 14 and virtual-machine save information 15. In the execution of an SIE instruction, the scalar instruction execution circuit 6 initializes the scalar processor 1 in accordance with the virtual-machine activate information 14. As described above, the SIE instruction puts the scalar processor 1 in the IE mode, allowing the virtual machine to start executing its instructions. When an instruction unprocessable by the virtual machine is encountered, the scalar instruction execution circuit 6 cancels the execution of the instruction, storing the state of the virtual machine and the cause of the cancellation of the instruction execution in the virtual-machine save information 15. The scalar instruction execution circuit 6 then puts the scalar processor 1 in a non-IE mode, allowing the execution of the instructions of the virtual-machine monitor 12 to be started on the scalar processor. The series of operations carried out by the scalar instruction execution unit 6 as described above in the event of the unprocessable instruction is called an interception.

Figure 3:
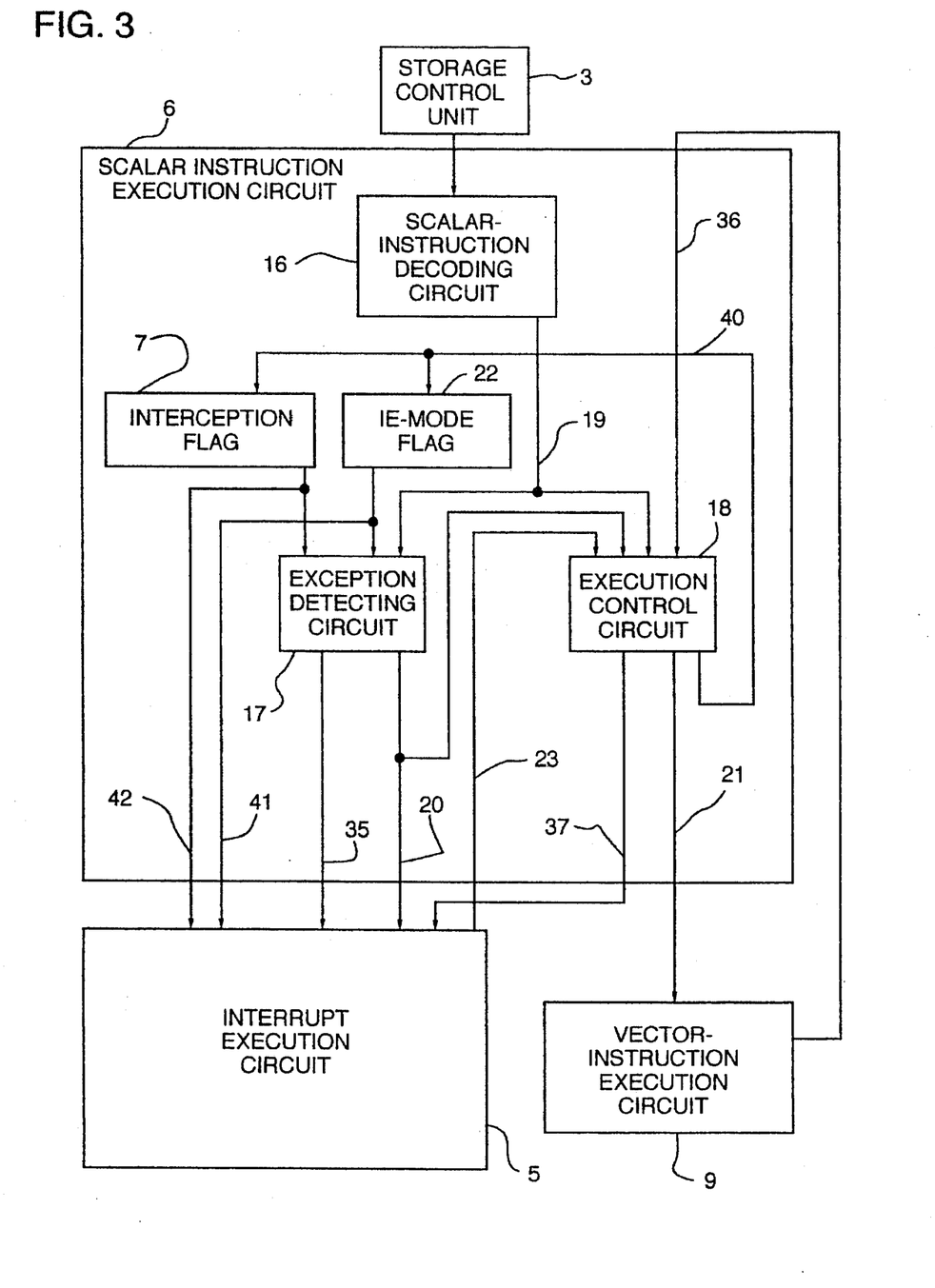
FIG. 3 shows a detailed configuration of the scalar-instruction execution circuit of FIG. 1.

A detailed configuration of the scalar instruction execution circuit 6 is shown in FIG. 3. A scalar-instruction decoding circuit 16 decodes a scalar instruction read from the main storage unit 4 by the storage control unit 3, and outputs execution control information to an execution control circuit 18 through a control line 19. The execution control circuit 18 controls data paths and processing of the scalar arithmetic operation in accordance with the execution control information. In the case of an EXVP instruction in particular, the execution control circuit 18 outputs an activation signal to the vector-instruction execution circuit 9 through a control line 21. In the case of a TVP instruction, the execution control circuit decodes information on the status of the vector processor 2 received from the vector-instruction execution circuit 9 through a line 36 in order to determine the present state of the vector processor 2. If the information on the status of the vector processor 2 received from the vector-instruction execution circuit 9 through the line 36 indicates an end-interrupt hold state, depending upon the value of the end-interrupt mask (the special bit in a PSW register described earlier), the execution control circuit 18 may discontinue the control of execution and, at the same time, notify the interrupt-execution circuit 5 of the generation of the end interrupt through a control line 37.

In addition, the execution control circuit 18 also controls the operation of the interception. The execution control information is output by the scalar-instruction decoding circuit 16 through the line 19 not only to the execution control circuit 18, but also to an exception detecting circuit 17. The execution control information is examined by the exception detecting circuit 17 to detect an exception that has caused a program interrupt. If an exception is detected, information on the instruction generating the exception is temporarily held. An exception-generation signal is then asserted on a control line 20 in order to discontinue the control-of execution being carried out by the execution control circuit 18 and, at the same time, to notify the interrupt-execution circuit 5 of the occurrence of the exception. On the other hand, the information on the instruction generating the exception held temporarily by the exception detecting circuit 17 is transmitted to the interrupt-execution circuit 5 through a line 35. In particular, when an exception is detected during the execution of an EXVP instruction, the activation signal through the control line 21 is removed. It should be noted that an IE-mode flag 22 is set to the logic value 1 in the IE mode, by the execution control circuit 18 through a control line 40.

Figure 4:
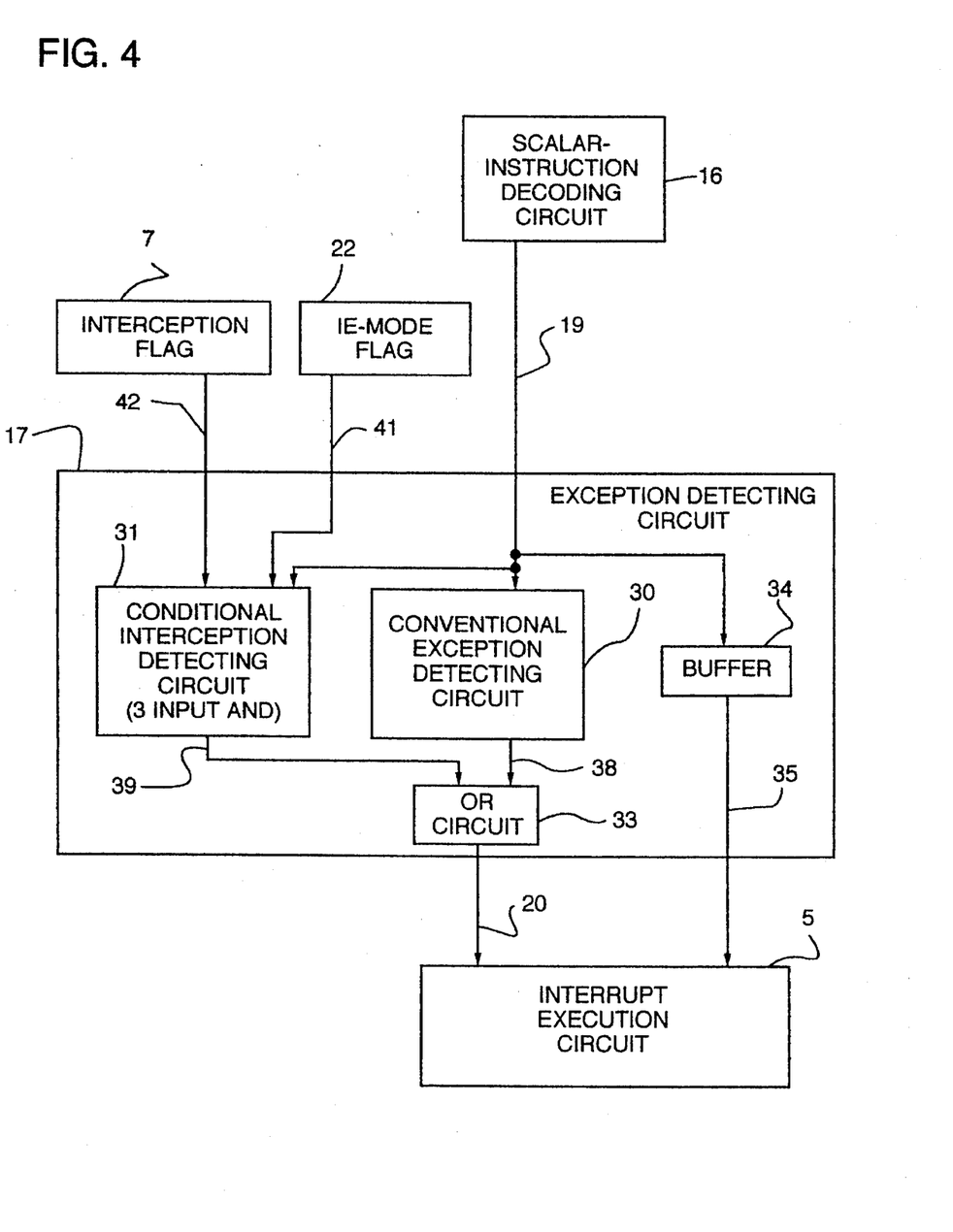
FIG. 4 shows a detailed configuration of the exception detecting circuit of FIG. 3.

A detailed configuration of the exception detecting circuit 17 is shown in FIG. 4. It is a conventional exception detecting circuit 30 that examines the execution control information to detect an exception that has caused a program interrupt. If an exception is detected, information on the instruction generating the exception is temporarily held in a buffer 34 and the logic value "1" is asserted on a control line 38 to indicate the occurrence of the exception.

The exception detecting circuit 17 is provided with a conditional interception detecting three input AND circuit 31 and an OR circuit 33, both of which are new. The conditional interception detecting circuit 31 asserts the logic value "1" on a control line 39 if the interception flag 7 is 1, the IE-mode flag 22 is 1 and the execution control information of an EXVP, TVP or a vector processor set-up instruction is output to the control line 19. When the logical OR of the values output to the control lines 38, 39 is 1, the OR circuit 33 asserts the exception-generation signal to a control line 20. Much like the IE-mode flag 22, the interception flag 7 is set by the execution control circuit 18 through the control line 40. The values of the IE-mode flag 22 and the interception flag 7 are transmitted to the exception detecting circuit 17 and the interrupt-execution circuit 5 through control lines 41 and 42 respectively (see FIG. 3). With this configuration, the exception detecting circuit 17 asserts the exception generation signal to the control line 20 if the interception flag 7 is 1, the IE-mode flag 22 is 1 and the execution control information of either an EXVP or TVP or a vector processor set-up instruction is output to the control line 19.

Figure 5:
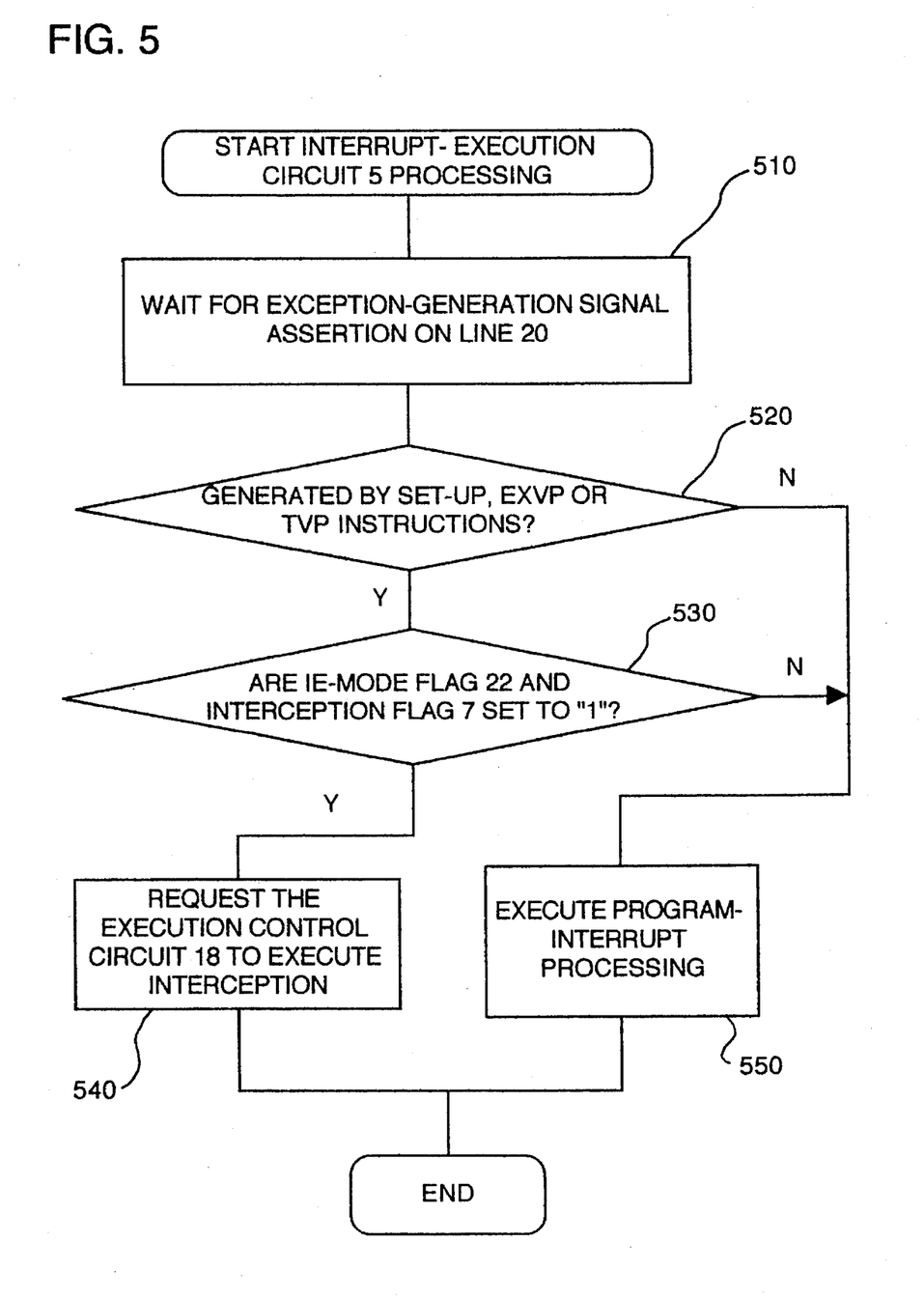
FIG. 5 is a flowchart of processing carried out by an interrupt execution circuit when an exception-generation signal is asserted on a control line 20 of FIG. 3.

The interrupt-execution circuit 5 provided by the present invention operates as shown in FIG. 5, for either (due to OR circuit 33) requesting the execution control circuit 18 to execute an interception, step 540, or executing a program-interrupt processing, step 550. To be more specific, as described earlier, IE-mode flag 22 set to the logic value 1 to indicate the occupation of the scalar processor 1 by a virtual machine, interception flag 7 set to the logic value 1, and execution control information output on the control line 19 as a result of decoding a set-up, EXVP or TVP instruction by the scalar-instruction decoding circuit 16, will cause the exception detecting circuit 17 to assert the exception-generation signal on the control line 20, halting the execution control of the instruction in question. Receiving the exception-generation signal in step 510, the interrupt-execution circuit 5 determines whether the instruction giving rise to the exception is set up, EXVP or TVP in step 520. The identification of the instruction is based on information received through the control line 35. If the instruction giving rise to the exception is not set up, EXVP or TVP, a program-interrupt processing is performed in step 550. If the instruction giving rise to the exception is set up, EXVP or TVP, on the other hand, the values of the IE-mode flag 22 and the interception flag 7 are examined in step 530. If the values of the IE-mode flag 22 and the interception flag 7 are found to be both 1, the execution control circuit 18 is requested through a control line 23 to execute an interception in step 540. Otherwise, the program-interrupt processing of step 550 is carried out.

In this way, the scalar processor 1 provided by the present invention executes an interception in response to a set-up, EXVP or TVP instruction and the setting of the interception flag 7 during the occupation of the scalar processor 1 by a virtual machine. As described above, an instruction for initiating an interception is detected as an exception. As a result, the interception can be implemented without adding new processing between the instruction decoding at the scalar-instruction decoding circuit 16 and the start of the execution control at the execution control circuit 18 while sustaining the conventional instruction-processing performance.

The solution to the first problem is described as follows with reference to FIG. 6.

Figure 6:
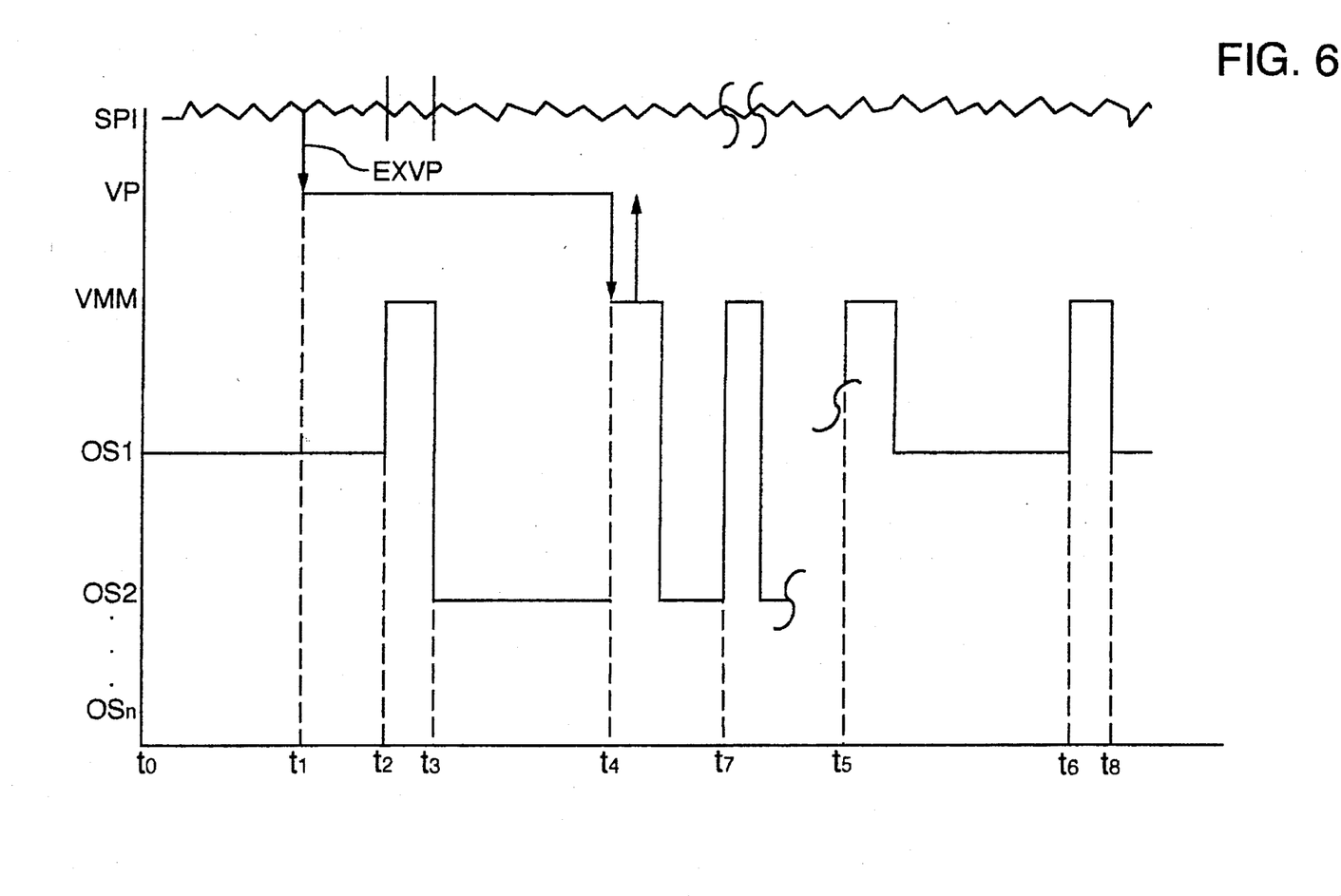
FIG. 6 is a timing diagram of operation in accordance with the present invention.

As a specific example of the first problem encountered when sharing a vector processor among plural virtual machines according to the present invention and the solution to the first problem also provided by the present invention, reference is made to FIG. 6 wherein a first operating system OS1 is operating on the scalar processor SP1 as a first virtual machine starting at time t0. At time t1, the OS1 calls for the execution of some vector processing on the vector processor VP by issuing an EXVP instruction, so that the vector processor is activated and enters the busy state. For some reason at t2, for example an interrupt caused by a timer indicating that the time for running the operating system OS1 has expired, the virtual machine monitor VMM will interrupt running the first operating system OS1 on the scalar processor SP and start operation of the second virtual machine by running the operating system OS2 on the scalar processor SP at time t3. At t4, the vector processor VP completes execution of the vector processing and sends out the vector-processing instruction end notification and enters the end interrupt hold state, as shown in FIG. 2. The first problem would arise in that the vector processor VP cannot report the end of vector processing to the first operating system OS1 and the first OS1 cannot perform the end-interrupt processing necessary to release the vector processor, because the first operating system is not running on a scalar processor; therefore, the vector processor would remain in the end interrupt hold state where it cannot be used by any other operating system and therefore it would effectively be dedicated to the first operating system OS1 and not shared by a plurality of operating systems OS2–OSn. However, in accordance with a further part of the present invention, the vector-processing instruction end notification from the vector processor VP is intercepted at time t4 and in response thereto the virtual machine monitor VMM interrupts the second operating system OS2 so that the vector processor can report the vector-processing instruction end notification; because the virtual machine monitor VMM will emulate the end-interrupt processing to the vector processor VP, including saving the contents of control information registers 10, the vector processor VP can enter the idle state, as shown in FIG. 2. Then the virtual machine monitor VMM controls the system to resume running of the second operating system OS2 on the scalar processor SP1.

Before resuming running of the second operating system OS2, the virtual machine monitor VMM sets the interception control field of the state descriptor 13 belonging to the OS1. The state descriptor 13 is in FIG. 1 and in FIG. 1 only one state descriptor is shown, but in fact, every guest OS has a state descriptor in main storage contained in each guest OS's information. The interception control field of the state descriptor above mentioned is included in the virtual-machine activate information 14.

When resuming the first operating system, the virtual machine monitor issues an SIE instruction which designates the OS1's state descriptor. When the scalar processor SP1 executes the SIE instruction, SP1 copies the interception control field of the state descriptor to the interception flag 7.

By this method the virtual machine monitor can set the interception flag 7 of the scalar processor SP1 to the logic value 1 at time t5.

Thereafter, for whatever reason and from whatever operating system OS2–OSn, the virtual machine monitor VMM will set the interception flag 7 of the scalar processor SP1 to the logic value 1 when resuming the running of the first operating system OS1 on the scalar processor SP1, at time t5. With the first operating system OS1 resuming running on the scalar processor SP1, the IE-mode flag 22 will be set to the logic value 1. At some time t6, the first operating system OS1 encounters an EXVP, TVP or set-up instruction to be executed, for example a TVP instruction to be executed to interrogate the status of the vector processor VP. At that time t6 the first scalar processor SP1 will check the interception flag 7 to get the notification of the vector-processing instruction end and vector processor control information from the VMM, by the VMM emulating the execution of the TVP instruction. Between time t4 and time t5, the vector processor VP was free to be shared by other operating systems OS2–OSn running on the scalar processor SP1 or scalar processors other than the scalar processor SP1. At time t6, the scalar-instruction decoding circuit 16 decodes the TVP instruction and sends out the appropriate signals on line 19 to the exception detecting circuit 17 and the execution control circuit 18. With such a signal on line 19, the IE-mode flag 22 set to 1 and the interception flag 7 set to 1, the execution detecting circuit 17 will assert an exception-generation signal on line 20 to the interrupt execution circuit 5, which is also receiving a signal on line 37 from the execution control circuit 18, so that in accordance with step 510 of FIG. 5, the interrupt execution circuit 5 then would check to see if the exception-generation signal was generated by one of the set-up, EXVP or TVP instructions in accordance with step 520 and since it was, step 530 checks to make sure that the IE-mode flag 22 and the interception flag 7 were set to 1. Then, in accordance with step 540 a signal is sent on line 23 to request the execution control circuit 18 to execute the interception, step 540. The execution control circuit, in response thereto, will halt the control of current execution, for executing an interception instead. The interception is performed by the virtual machine monitor, which checks the virtual-machine save information 15 to identify the cause of the interception as the appearance of the TVP instruction in the first operating system OS1, so that the virtual machine monitor VMM will then emulate the execution of the TVP instruction (which instruction is intended to be executed by the scalar processor SP). Accordingly, the virtual machine monitor VMM obtains the state of the vector processor VP from the virtual-machine activate information 14 and reports it to the OS1 thus emulating the TVP instruction, then sets the interception flag 7 to logic value 0, and then resumes the running of the first operating system OS1 on the scalar processor SP 1 at t8. In this way, the first operating system OS1 can judge the status of the vector processor VP 2 correctly from the virtual-machine activate information 14, because the virtual machine monitor 12 has emulated the end-interrupt processing of the vector processor 2 at t4 and the TVP instruction at t6. In addition, following the interception caused by the TVP instruction of the first operating system OS1, the interception flag 7 is 0 so that the first operating system can thereafter directly execute the TVP instruction by itself without generating an interception, allowing an overhead due to the intervention by the virtual machine monitor 12 to be reduced. On the other hand, when an operating system OS2–OSn (other than the first operating system OS1) is run on the scalar processor SP after time t4 when the virtual machine monitor 12 has completed the emulation of the end-interrupt processing of the vector processor 2, the virtual machine monitor 12 resets the interception flag 7 to the logic value 0. In this way, the running of the second or subsequent operating system OS2–OSn from t4 to t5 will not be affected by the OS1 previously using the VP even if the virtual machine monitor 12 has emulated the end-interrupt processing of the vector processor 2 at t4.

The following is the description of the solution to the second problem mentioned above, which is provided by the present invention, with reference to FIG. 6.

In the above-described operation, at t4, the VMM saves the contents of the control information registers 10 into the state descriptor 13 so that the vector processor VP 2 is then ready to execute a vector processing instruction from an operating system other than the first operating system OS1, i.e. OS2–OSn, and when the first operating system OS1 resumes its running of the scalar processor SP1 at time t5 with the setting of the interception flag 7 to the logic value 1 as described above, the virtual machine monitor VMM will restore the contents of the registers 10, 11 of the vector processor VP from values saved in the state descriptor 13 of the virtual machine monitor 12. The save and restore times of the vector processor are perhaps a multiple of 100 the save and restore times of the scalar processor, because of the size of the registers in the vector processor and large quantity of information held therein. Thus, if no operating system OS2–OSn uses the vector processor between t4 and t5 (the time during which the operating system OS1 is not running on the scalar processor) it is seen that the saving and restoring of the registers 10, 11 in the vector processor at times t4 and t5 or t6 has not been necessary. That is if there is no use of the vector processor during the times t4–t5 when the first operating system OS1 is not running on the scalar processor SP 1, then there is no need to save and restore the vector processor registers 10, 11, which saving and restoring occupies a large amount of time of the virtual machine monitor VMM running on the scalar processor, during which time an operating system OS1–OSn cannot run on the scalar processor. This is the second problem that is solved by the present invention. In accordance with the solution, the registers 10 and 11 of the vector processor have their information saved and restored by the virtual machine monitor VMM only when another operating system OS2–OSn uses the vector processor during the time period t4–t5 when the first operating system OS1 is not running. This will be described in more detail in the following.

To solve the second problem, the virtual machine monitor 12 will set the interception flag 7 to the logic value 1 at time t2–t3 immediately prior to the second operating system OS2 running on the scalar processor SP1 and the end-interrupt processing at t4 will be as previously described except that the contents of registers 10, 11 will not be saved. Thereafter, if none of the operating systems OS2–OSn access the vector processor or use the vector processor up to time t5, then when OS1 again runs on the scalar processor, the VMM will set the interception flag 7 to 0 and the TVP etc. instructions will be executed directly with the VP without the VMM.

The virtual-machine monitor 12 sets the interception flag 7 to the logic value 1 at T2–t3 prior to the execution of the second OS at t3. While the second OS is running on the scalar processor 1, the IE-mode flag 22 is also set at the logic value 1. If a set-up or EXVP instruction is decoded by the scalar-instruction decoding circuit 16 with the interception and IE-mode flags 7, 22 both set to the logic value 1 at t7, the execution control circuit 18 halts the control of execution, executing an interception. From the virtual-machine save information 15, the virtual-machine monitor 12 recognizes that the cause of the interception is the set-up or EXVP instruction appearing in the second OS. In this case, control information in the registers 10 of the vector processor 2 are saved in the state descriptors and initial values for the vector processing of the instruction are restored into the registers 11 and the interception flag is reset to logic zero at t7, and thereafter at t5 the interception flag is set to one. In this way, the second OS can run on the scalar processor 1 without regard to the status of the vector processor 2 until either the set-up or EXVP instruction is decoded by the scalar instruction decoding circuit 16 at t7. On the other hand, when the virtual-machine monitor 12 resumes running of the first OS following the running of the second OS but prior to the appearance of a set-up or EXVP instruction, i.e. from t2–t7 the interception flag 7 is reset to the logic value 0 because it will not be necessary to save and restore the control information of the vector processor 2 and the initial values of the vector processing from and into the registers 10 and 11 respectively. After the scalar processor 1 is switched from the second OS to the first OS at t5, the interception flag 7 remains at the logic value 0 if there was no vector processing instruction at t7. When the scalar-instruction decoding circuit 16 decodes a set-up or EXVP instruction during the execution of the first OS on the scalar processor 1 at t6, e.g. the instruction is executed as it is without generating an exception due to the fact that the interception flag 7 has been reset to the logic value 0 (which is true when no vector processing instruction is issued at t7). In this way, unnecessary operations to save and restore the control information of the vector processor 2 and the initial values of the vector processing from and into the registers 10 and 11 respectively can be eliminated when no other OS (other than OS1) uses the VP from t1 to t5.

An example of only two operating systems, that is, the first OS and the second OS, sharing the vector processor 2 has been given for explaining the embodiment. It should be noted, however, that one can understand with ease that the principle of operation also holds true for three or more operating systems running on one or more scalar processors as different virtual machines, with two or more of the virtual machines sharing at least one vector processor.

A supercomputer comprising at least one scalar processor 1 and at least one vector processor 2 has been explained in the description of the embodiment. It is also obvious, however, that the present invention can be applied to a multiprocessor configuration comprising pairs of scalar and vector processors 1 and 2 connected to each other. It is equally clear that the present invention can be applied not only to supercomputers but also to computers having a similar configuration.

In a virtual-machine system provided by the present invention wherein a vector processor is shared among a plurality of operating systems, a virtual-machine monitor can emulate the end-interrupt processing of the vector processor, allowing the utilization efficiency of the vector processor to be increased. In addition, the virtual machine monitor is deliberately given chances to save and restore control information of the vector processor and initial values of vector processing from and into registers, allowing the efficiency of the system as a whole to be enhanced. Moreover, the virtual-machine system can be implemented without deteriorating the functional extension of the conventional hardware and the conventional instruction processing performance.

While a preferred embodiment has been set forth with specific details, further embodiments, modifications and variations are contemplated according to the broader aspects of the present invention, all as determined by the spirit and scope of the following claims.

We claim:

1. For use in a computer system having a scalar processor, a vector processor, a plurality of operating systems, and a virtual environment for running the plurality of operating systems on the scalar processor as virtual machines under control of a virtual machine monitor, a virtual environment operating method, comprising the steps of:

running the operating systems selectively on the scalar processor as virtual machines to share the scalar processor with the operating systems;

controlling said vector processor and said scalar processor, for assigning vector processing tasks from any of said virtual machines to said vector processor for sharing the vector processor among the operating systems running on said scalar processor;

running a first operating system on the scalar processor so that said running of the first operating system on the scalar processor thereby requests the vector processor to execute a first vector processing job;

sending a notice of vector processing end by the vector processor to the first operating system and intercepting the notice of the vector processing end by the virtual machine monitor;

wherein said intercepting includes setting an interception flag; and thereafter running the first operating system on the scalar processor, checking the interception flag and receiving an end of vector processing report by the first operating system.

2. For use in a computer system having a scalar processor, a vector processor, a plurality of operating systems, and a virtual environment for running the plurality of operating systems on the scalar processor as virtual machines under control of a virtual machine monitor, a virtual environment operating method, comprising the steps of:

running the operating systems selectively on the scalar processor as virtual machines to share the scalar processor with the operating systems;

controlling said vector processor and said scalar processor, for assigning vector processing tasks from any of said virtual machines to said vector processor for sharing the vector processor among the operating systems running on said scalar processor;

running a first operating system on the scalar processor so that said running of the first operating system on the scalar processor thereby requests the vector processor to execute a first vector processing job;

thereafter executing the first vector processing job on the vector processor to reach a vector processing end state;

during said executing, running a second operating system on the scalar processor instead of the first operating system for at least up to the time of the vector processor reaching the vector processing end state; and after the vector processor reaches the vector processing end state, sending a notice of vector processing end by the vector processor to the first operating system and intercepting the notice of the vector processing end by the virtual machine monitor without changing the second operating system of the scalar processor to the first operating system.

3. The method of claim 2, wherein said intercepting includes interrupting the running of the second operating system on the scalar processor, running the virtual machine monitor to send an end-interrupt processing to the vector processor to place the vector processor in an idle state, thereafter setting an interception flag, and returning to said running of the second operating system on the scalar processor.

4. The method of claim 3, further including the steps of:

thereafter running the first operating system on the scalar processor and in response to the first operating system attempting to access the vector processor, checking the interception flag and receiving an end of vector processing report by the first operating system.

5. The method of claim 2, further including the steps of:

in response to said sending, placing the vector processor in an idle state and sharing the vector processor by a plurality of the operating systems.

6. The method of claim 5, further including the steps of:

thereafter running a second operating system on the scalar processor and thereby executing a job on the vector processor after the vector processor has entered the idle state and before an end of vector processing has been reported by the virtual machine monitor to the first operating system.

7. For use in a computer system having a scalar processor, a vector processor, a plurality of operating systems, and a virtual environment for running the plurality of operating systems on the scalar processor as virtual machines under control of a virtual machine monitor, a virtual environment operating method, comprising the steps of:

running the operating systems selectively on the scalar processor as virtual machines to share the scalar processor with the operating systems;

controlling said vector processor and said scalar processor, for assigning vector processing tasks from any of said virtual machines to said vector processor for sharing the vector processor among the operating systems running on said scalar processor;

running a first one of the operating systems on the scalar processor and thereby requesting execution of a first vector processing task by the vector processor;

thereafter running a second one of the operating systems on the scalar processor at the time of ending execution of the first vector processing task by the vector processor;

at the time of the ending of the execution of the first vector processing task on the vector processor, holding without saving contents of internal registers of the vector processor;

using the held contents of the registers by the first operating system again running on the scalar processor; and saving the contents of the internal registers of the vector processor when another operating system requests access to the vector processor and thereafter restoring the contents of the internal registers after the another operating system ceases running on the scalar processor.

8. For use in a computer system having a scalar processor, a vector processor, a plurality of operating systems, and a virtual environment for running the plurality of operating systems on the scalar processor as virtual machines under control of a virtual machine monitor, a virtual environment operating method, comprising the steps of:

running the operating systems selectively on the scalar processor as virtual machines to share the scalar processor with the operating systems;

controlling said vector processor and said scalar processor, for assigning vector processing tasks from any of said virtual machines to said vector processor for sharing the vector processor among the operating systems running on said scalar processor;

running a first operating system on a scalar processor and thereby activating the vector processor to a busy state to run vector processing for the first operating system;

upon completion of the vector processing, sending a vector-processing instruction end notification from the vector processor and intercepting the notification by the virtual machine monitor; and in response to said intercepting, emulating an end-interrupt processing by the virtual machine monitor to change a state of the vector processor from an end interrupt hold state to an idle state wherein the vector processor is capable of being activated by any of the operating systems for further vector processing.

9. A method of claim 8, further including;

thereafter in response to the first operating system running on a scalar processor and starting to execute a vector processor instruction, intercepting and emulating the vector processor instructed by the virtual machine monitor.

10. The method of claim 9, wherein said step of emulating is performed independently of the vector processor.

11. The method of claim 9, wherein said step of emulating the vector processing instruction cancels the instruction.

12. The method of claim 11, wherein said step of emulating the vector processing instruction is performed independently of the first operating system.

13. The method of claim 12, wherein said step of emulating the vector processing instruction is performed independently of the vector processor.

14. The method of claim 9, wherein said step of emulating an end-interrupt processing includes setting an interception flag on the scalar processor, and said steps of intercepting and emulating the vector processor instruction is in response to decoding an instruction in the scalar processor that involves the vector processor, running of the first operating system on the scalar processor and the interception flag being set.

15. The method of claim 8, wherein said step of emulating is performed independently of running the first operating system.

16. The method of claim 8, wherein said step of emulating is performed independently of the vector processor.

17. The method of claim 8, further including discontinuing said running a first operating system on the scalar processor during the vector processing and running a second operating system on the scalar processor until performing said steps of intercepting and emulating, and after performing said steps of intercepting and emulating, continuing said running a second operating system on the scalar processor.

18. The method of claim 8, further including the steps of:

running a second operating system on the scalar processor after said steps of intercepting and emulating;

thereafter resuming running of the first operating system on said scalar processor; and during said step of resuming running, in response to decoding an instruction of the first operating system for accessing the vector processor, (1) executing said instruction with respect to the vector processor when no other operating system has used the vector processor between said steps of running a first operating system and resuming running of the first operating system, or (2) when an operating system other than the first operating system has used the vector processor during a period between said running a first operating system and said resuming running of the first operating system, performing a step one of restoring information in registers of the vector processor by the virtual machine monitor or reporting vector processor register information from the virtual machine monitor to the first operating system in accordance with content of the instruction.

19. The method of claim 18, wherein said steps of (1) executing and (2) performing are performed selectively in accordance with a value of an interception flag set by the virtual machine monitor.

20. A virtual machine system, comprising:

a scalar processor;

a vector processor;

a plurality of different operating systems;

a virtual machine monitor for controlling running of the operating systems selectively on the scalar processor as virtual machines to share the scalar processor with the operating systems;

said virtual machine monitor controlling said vector processor and said scalar processor, for assigning vector processing tasks from any of said virtual machines to said vector processor for sharing the vector processor among the operating systems running on said scalar processor;

said vector processor notifying an end of vector processing to an operating system that requested a vector processing and said virtual machine monitor intercepting the notifying at least when said scalar processor is running an operating system other than the operating system that requested running of the vector processing on the vector processor, and thereafter said virtual machine monitor setting the vector processor to an idle state for sharing by any of the operating systems running on the scalar processor.

21. The system of claim 20, wherein said virtual machine monitor includes means for setting an interception flag so that the operating system that requested running of the vector processing that resulted in the notifying at a later time in response to the interception flag receives vector processing information under control of the virtual machine monitor.

22. A virtual machine system, comprising:

a scalar processor;

a vector processor;

a plurality of different operating systems;

a virtual machine monitor for controlling running of the operating systems selectively on the scalar processor as virtual machines to share the scalar processor with the operating systems;

said virtual machine monitor controlling said vector processor and said scalar processor, for assigning vector processing tasks from any of said virtual machines to said vector processor for sharing the vector processor among the operating systems running on said scalar processor;

a first one of said virtual machines running on the scalar processor, in response to a vector processor use instruction activating the vector processor to a busy state to run vector processing for the first operating system;

said vector processor, upon completion of the vector processing, sending a vector-processing instruction end notification from the vector processor; and said virtual machine monitor intercepting the vector-processing instruction end notification and emulating an end-interrupt processing to change a state of the vector processor from an end interrupt hold state to an idle state wherein the vector processor is capable of being activated by any of the virtual machines for further vector processing.

23. A virtual machine system, comprising:

a scalar processor;

a vector processor;

a plurality of different operating systems;

a virtual machine monitor for controlling running of the operating systems selectively on the scalar processor as virtual machines to share the scalar processor with the operating systems;

said virtual machine monitor controlling said vector processor and said scalar processor, for assigning vector processing tasks from any of said virtual machines to said vector processor for sharing the vector processor among the operating systems running on said scalar processor;

wherein said vector processor sends a vector processing instruction end notification to a virtual machine that instructed vector processing; and said virtual machine monitor intercepting the notification, canceling the notification, and emulating an end-interrupt processing to release the vector processor from an end interrupt hold state to an idle state where the vector processor is capable of being activated by another of the virtual machines.

24. The system of claim 23, wherein said virtual machine monitor saves and restores registers of said vector processor when an operating system other than a first operating system activates said vector processor.

25. A virtual machine system, comprising:

a scalar processor;

a vector processor;

a plurality of different operating systems;

a virtual machine monitor for controlling running of the operating systems selectively on the scalar processor as virtual machines to share the scalar processor with the operating systems;

said virtual machine monitor controlling said vector processor and said scalar processor, for assigning vector processing tasks from any of said virtual machines to said vector processor for sharing the vector processor among the operating systems running on said scalar processor; and wherein said virtual machine monitor intercepts an instruction from a first operating system for accessing the vector processor only when the vector processor has been previously used by an operating system other than the first operating system after being used by the first operating system, and in response to the interception of the instruction cancels and emulates the instruction.

* * * * *